Nov. 10, 1931.  E. C. OTIS  1,831,422
APPARATUS FOR CUTTING SHEET MATERIAL
Filed Jan. 6, 1930  2 Sheets-Sheet 1
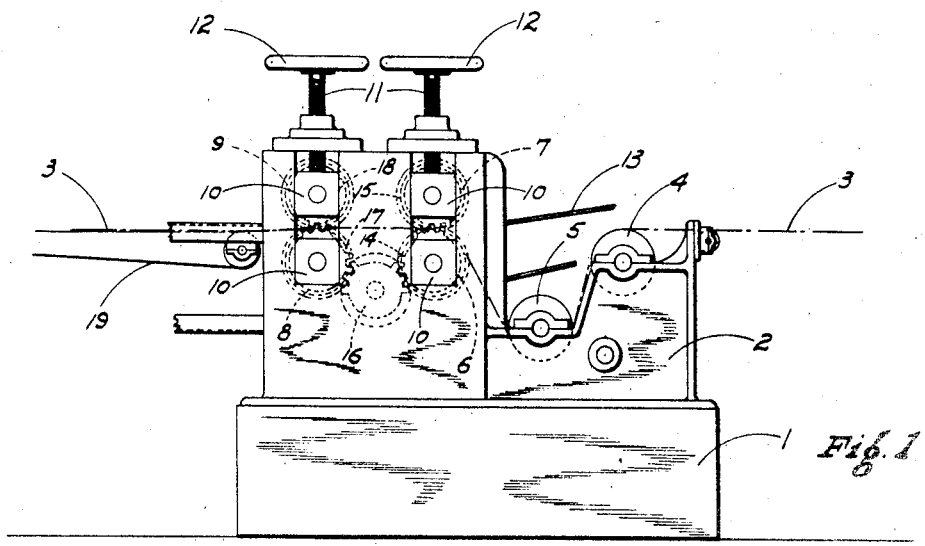
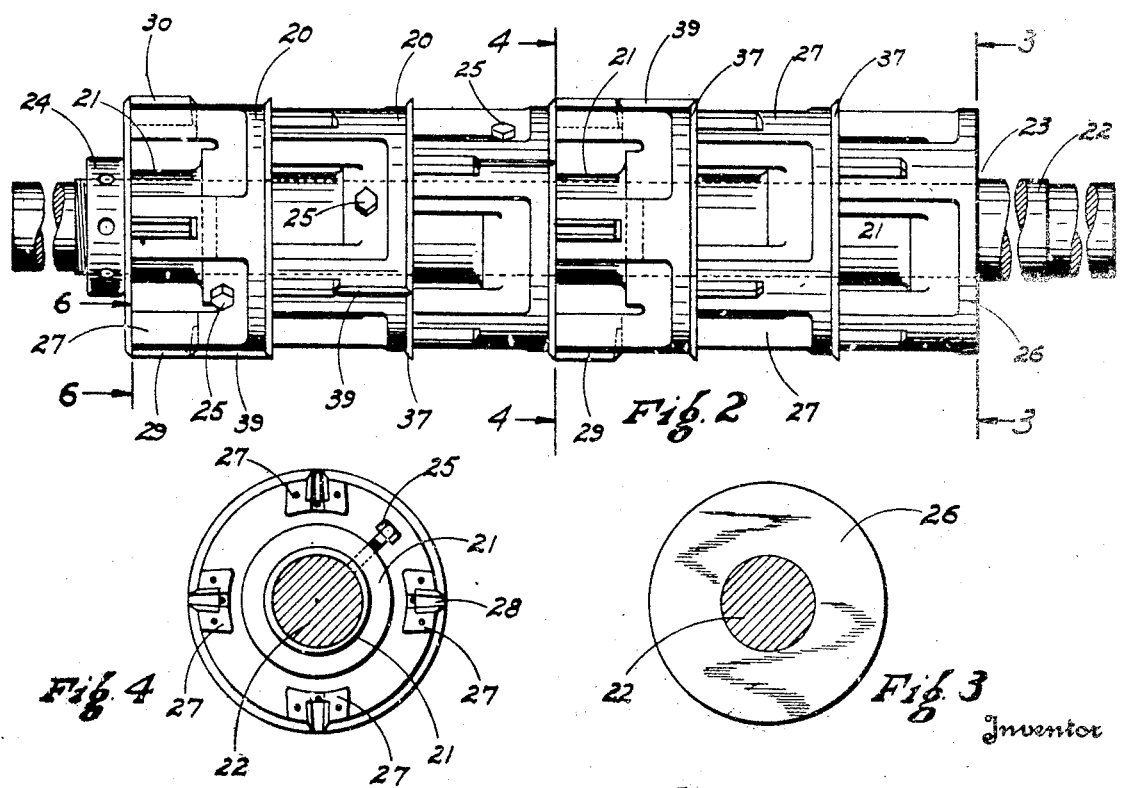
Inventor
EDWARD C. OTIS.
By Richey & Watts
Attorney

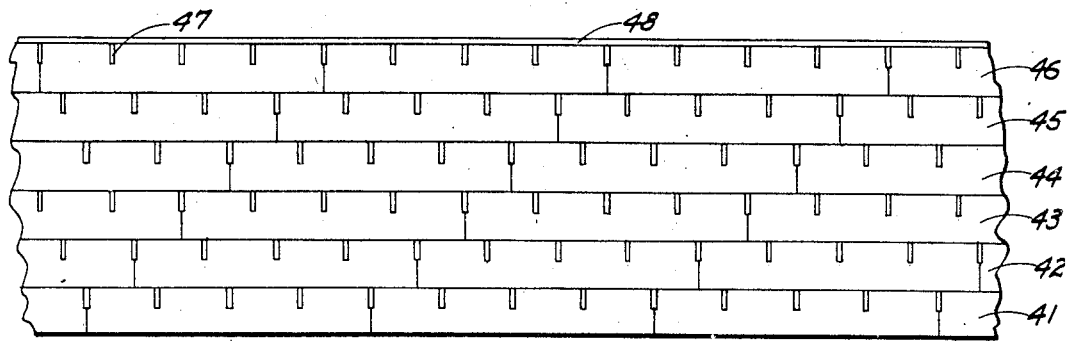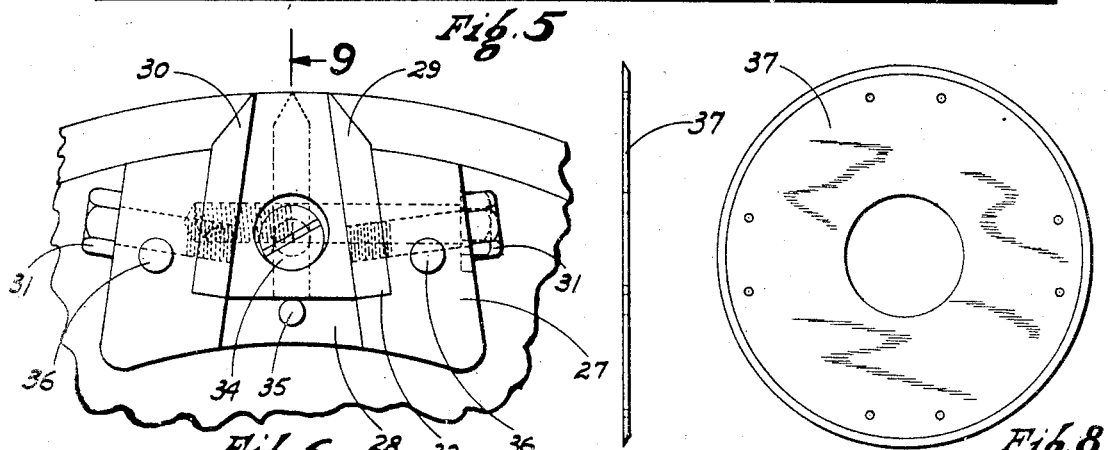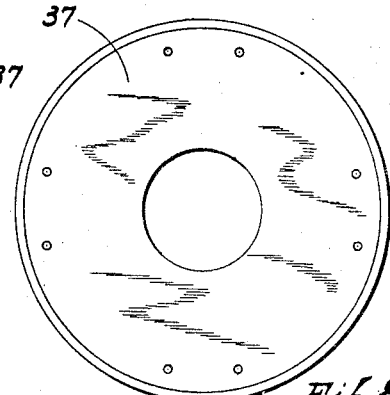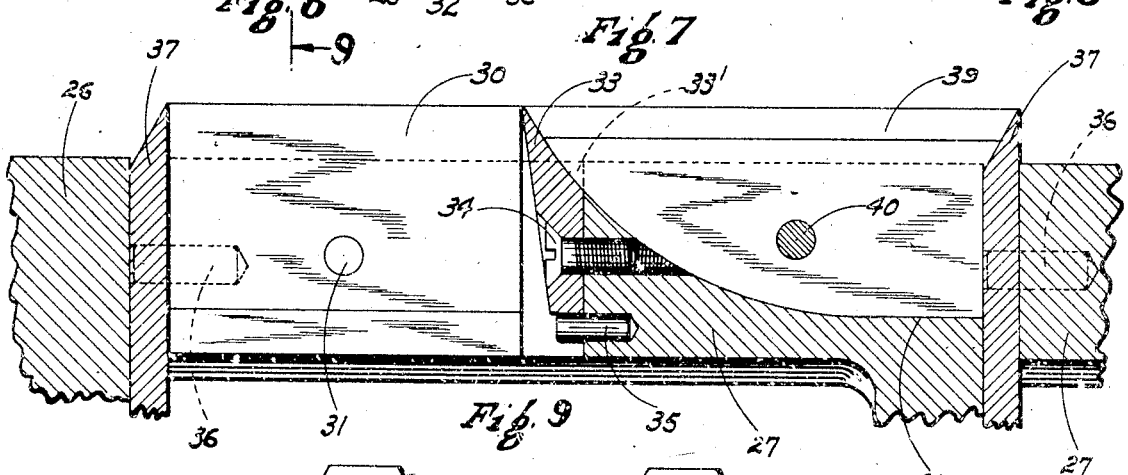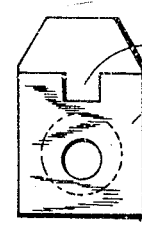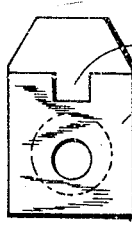
Inventor
EDWARD C. OTIS.

Patented Nov. 10, 1931

1,831,422

UNITED STATES PATENT OFFICE

EDWARD C. OTIS, OF PARMA, OHIO, ASSIGNOR TO THE WEAVER WALL COMPANY, OF CLEVELAND, OHIO, A CORPORATION OF OHIO

APPARATUS FOR CUTTING SHEET MATERIAL

Application filed January 6, 1930. Serial No. 418,730.

This invention relates to machines for cutting sheet material and more particularly to apparatus for continuously cutting a sheet of asphalt impregnated and slate coated felt roofing material or the like into finished strip shingles or siding.

In the manufacture of fire and weather proof shingles or siding for buildings it is common practice to impregnate a long sheet of felt with an asphalt compound or the like and then coat one side of the sheet with finely ground slate. This slate is rolled into the impregnated felt under pressure and the strip then allowed to cool, the resulting product being flexible, fire and weather proof, and adapted to be cut into any desired design or type of roof or wall covering. My invention is particularly adapted to efficiently and economically cut the impregnated and coated material into the desired form.

The machine illustrated and described herein is designed to cut a long and comparatively wide sheet of prepared material into a number of narrow and comparatively short strips of siding. This siding is so shaped that when properly applied to the side of a building it will have the appearance of a brick wall. To secure this desired appearance it is necessary to cut out and remove certain parts of each individual siding strip as is more particularly described below.

Among the objects of my invention therefore, are:

The provision of a machine for cutting siding strips from a comparatively wide and long sheet or web of suitable material in which the web will be slit longitudinally into a plurality of siding strips, the desired portions of each strip be cut out and removed and the siding strips be cut to the desired length by a single cutting roll.

The provision of a siding cutting machine in which the cut-outs are completely removed from the material and dropped out of the machine.

The provision of a siding cutting machine which will cut individual strips of siding from a moving web of material with absolute accuracy in size and shape of the finished product.

The provision of a single cutting roll for strip cutting machines which will perform all the cutting operations necessary to produce the desired shaped units and remove and dispose of the cut-outs.

The provision of a sectional cutting roll which may be easily repaired and adjusted to cut different sizes and shapes of finished product from the same sheet or web in one continuous operation.

The provision of a smoothly operating cutting roll which will cut a plurality of siding strips from a sheet of material with a minimum of vibration and shock to the machine.

The provision of a cutting roll having individually removable cutters for making a plurality of longitudinal cuts in a web of material, simultaneously cutting out portions of the web and cutting off definite lengths of finished product.

The above and other objects of my invention will be seen from the following description of a preferred form of my invention reference being had to the accompanying drawings.

In machines of this class with which I am familiar the web is slit longitudinally with one set of knives or cutters and the notches or tabs cut out by another set of cutters or dies longitudinally spaced from the first. Any slipping or buckling of the sheet lengthwise or movement transversely will cause a variation in the width or length of the finished product as well as a variation in size or location of the cut-out portions. This is impossible with my improved machine as all the cutting operations are performed by a single cutting roll in one single operation. Other advantageous features of my machine will be seen by those skilled in the art from the following description.

In the drawings:

Figure 1 is a side elevation of one embodiment of my machine for cutting strip material;

Figure 2 is an elevation of my improved cutting roll;

Figure 3 is an end view taken on line 3—3 of Figure 2;

Figure 4 is a section taken on line 4—4 of Figure 2;

Figure 5 is a plan view illustrating how the sheet of material is cut into siding strips as it passes through my machine;

Figure 6 is an enlarged view of one set of cutting knives taken on line 6—6 of Figure 2;

Figures 7 and 8 are detached views of one of the longitudinal slitting cutters;

Figure 9 is a section taken on line 9—9 of Figure 6;

Figure 10 illustrates one form of tab end cutting knife;

Figure 11 is a view similar to Figure 10 but illustrating a second form of tab end cutting knife.

The cutting machine shown in Figure 1 may be mounted upon a suitable base 1 and consists essentially of a frame 2 together with the various rolls, gears, etc. mounted thereon. The web of prepared material 3 is indicated by a broken line and preferably comes to the cutting machine direct from the processing apparatus, thus making the manufacture of the siding strips a continuous process from the point where the large rolls of untreated felt enter the impregnating vats until the finished siding strips leave the cutting machine. The sheet of material 3 passes over the guide rolls 4 and 5 which are mounted to rotate freely in bearings on the frame 2. From roll 5 the material passes upwardly to the cutting roll 6 and between this roll 6 and a smooth faced backing roll 7 to the take-off rolls 8 and 9. The rolls 6, 7, 8 and 9 are mounted on shafts which have bearings in adjustable bearing blocks 10. These blocks 10 are disposed in vertical grooves in the frame 2 and the upper blocks, which carry the bearings for rolls 7 and 9, may be vertically adjusted by screws 11 which have threaded engagement with the frame 2 and are provided with hand wheels 12 at their upper ends. By turning the hand wheels 12 the distance between roll 7 and cutting roll 6 and between roll 8 and roll 9 may be accurately adjusted.

The rolls 6, 7, 8 and 9 are all of the same diameter and are all driven from any suitable source of power. In the machine illustrated the driving belt 13 is driven by a motor or the like and engages a pulley (not shown) secured to the shaft which carries cutting roll 6. A gear 14 is also secured to the shaft which carries roll 6 and meshes with the gear 15 secured to the shaft which carries roll 10. Gear 14 also meshes with an idler gear 16 which in turn engages gear 17 on the shaft of take-off roll 8. The roll 9 is driven through the gear 18 which is mounted on the same shaft as roll 9 and meshes with gear 17. This series of gears may all be of the long tooth type to facilitate adjustment of the spacing between the rolls and it will be seen that when roll 6 is driven by the belt 13 the rolls 7, 8 and 9 are also driven through the above described gear train and will feed the material through the machine at a constant rate.

As the web of material passes between the cutting roll 6 and the back-up roll 7 it is cut into siding strip units of the desired shape and length by the knives on the cutting roll 6. The cut-out portions of the strips drop out through the openings in the roll 6 as will be more fully described later and then the finished siding strips pass on between the driven take-off rolls 8 and 9 to the conveyor belt 19. This conveyor belt 19 travels at a slightly higher speed than the speed at which the material passes between the cutting and take-off rolls and carries the finished siding strips away from the machine to a point at which they are bundled for shipment.

As illustrated in Figure 2 the cutting roll 6 is composed of a number of independent units 20 which carry the cutting knives. Each of these units has a hub portion 21 adapted to fit the shaft 22. This shaft 22 is provided with a shoulder portion 23 at one end and is threaded at the other end to take the locking nut 24. The portion of the shaft 22 between the shoulder 23 and the threaded portion at the opposite end is of such diameter as to permit the units 20 to be readily slipped into position with the shaft passing through the hole in their hub portions 21. The units are held in place on the shaft by locking nut 24 and also by the individual set screws 25 which pass through the hub portion of each of the units 20 and are adapted to hold the units firmly in the desired position on the shaft 22.

As all of the units 20 are of the same construction, a description of one will be sufficient. The hub portion 21 carries a circular radially extending flange 26. Extending perpendicularly to the flange 26 and parallel to the shaft 22 are four knife carrying arms 27. These arms 27 are connected to the flange 26 adjacent its periphery, are radially removed from the hub portion 21 and are equally spaced about the circumference of the roll. The arms 27 have open ended slots 28 extending inwardly from their unsupported ends. These slots 28 are designed to carry the cut-out knives and are preferably tapered in cross-section taken on a plane perpendicular to the roll axis so that they are widest at their inner ends.

Referring particularly to Figure 6, the transverse cut-out knives 29 and 30 are removably mounted in the slots 28 and are held in position by the screws 31, which extend through holes in the arms 27 and have threaded engagement with the knives 29 and 30. The side walls of the slots 28 are notched, as at 32, to provide a firm support for the knives 29 and 30 and also a smooth inner surface for the slot 28 when the knives are in position.

The small end cut-off knives 33 and 33″ may be held in place at the ends of slots 28 by screws 34 and are preferably backed up at their inner ends by pins 35. These knives 33 and 33″ are also tapered in cross-section as shown in Figure 9 so that the lengthwise dimension of the slots 28 is greater at their inner ends than it is at the cutting edges of the knives. Pins 36 extend out from the ends of the arms 27 and are adapted to engage holes in the circular disc slitting cutter 37. These cutters 37 are held in position by the pins 36 and are so disposed that their cutting edges close the end of the slots defined by the cutting edges of the cut-out knives 29, 30, 33 and 33″.

It will be seen from the above description that the assembly of knives in each of the arms 27 together with the disc cutter 37, which is mounted on the ends of arms 27, forms an elongated cutting die which, at its cutting edge, is of the proper dimensions to cut the desired size of cut-out or tab. The die thus formed is so shaped that the tabs cut-out will pass freely through the slots 28 into the spaces between the arms 27 and the hub 21 and then drop completely out through the openings between the circumferentially spaced arms 27.

On each unit 20 one of the arms 27 is provided with a groove 38 extending from the base of the slot 28 to the face of the flange 26. End cut-off knives 39 (Fig. 9) are adapted to fit in these grooves and be held in place by the screws 40 which extend through the arms 27. As is seen in Figure 9, these knives 39 extend longitudinally of the cutting roll and their cutting edges lie in the surface of the cylinder in which the cutting edges of all of the other knives lie.

The knives 33 (Fig. 11) are mounted on the arms 27 which are grooved to take end cut-off knives 39. These knives 33 are notched at 33′ to allow the cutting edge of the knife 39 to meet the cutting edge of knife 33. The knives 33″ (Fig. 10) are mounted on the arms 27 which do not carry end cut-off knives and therefore do not need to be notched in the above described manner.

In arranging the assembled cutting units 20 on the shaft 22, it will be seen from Figure 2 that the arms 27 of the separate units are preferably arranged so that they are staggered in relation to the arms 27 of their adjacent units. In like manner the end cut-off knives 39 are staggered around the circumference of the roll. When the units 20 are arranged on the shaft in the manner shown in Figure 2 the cuts made in a sheet of material as it passes betwen the cut-off roll 6 and the backing up roll 7 will be as illustrated in Figure 5. As shown in this view the original sheet or web of material 3 has been cut into longitudinally extending strips 41, 42, 43, 44, 45 and 46 by the disc slitting cutters 37. The staggered cut-out knives have cut-out and removed the regularly spaced tabs 47 and the end cut-off knives 39 have cut each of the strips 41, 42, 43, 44, 45 and 46 into a series of individual siding strips of the desired length. The web 3 is preferably made slightly wider than the sum of the widths of the siding strips cut from it and therefore there will be a narrow strip 48 cut-off on one side of the disc cutter 37 which is adjacent the nut 24. The other edge of the sheet 3 may be located by a suitable guide as it passes through the machine so that it always lies in the plane of the surface of the flange 26 of the end unit 20 which abuts the shoulder 23 on the shaft 22.

By staggering the arms 27 in the manner shown and described, there are never more than two cut-out dies working on the stock at one time. This makes a much smoother operating machine than would result if the arms 27 were all aligned and six complete cut-outs were made at one time.

When my machine is in operation and a sheet of prepared material is being fed to it from any suitable source of supply the various cutters of the roll 6 cut the sheet into completely formed siding strips as the sheet passes between the cutting edges of the knives and the smooth faced roll 7. The roll 7 is adjusted by means of the hand wheels 12 so that the cutting edges of the knives of roll 6 just clear the surface of roll 7. The knives will then cut completely through the material and the cut-out tabs will be completely severed. As the end cut-off knives 39 are staggered on the circumference of the roll, a single finished strip will be cut off by one of the knives 39 at each sixty degrees of the roll's rotation and one revolution of the roll 6 will cut six complete siding strips. After being cut from the sheet, the individual siding strips may be conveyed away by suitable belts 19 and stacked in as many separate piles as there are sections of the cutting roll.

Each individual siding strip is cut completely by a single cutting roll and therefore absolute uniformity of product is assured. There is no possibility of slipping or buckling of the sheet as is frequently the case where the longitudinal slitting and the notch cutting are done by separate spaced apart cutter rolls.

In my improved skeleton cutter roll there is no chance of the cut-out tabs plugging the knives as the slots through which the tabs fall after being cut out by the knives are larger in all dimensions than the tabs. The skeleton construction of the roll allows the tabs which fall through the slots 28 to drop out of the roll and fall to the floor or be caught in a suitable receptacle.

There is a separate section of the cutting roll for cutting each line of siding strips from the sheet and it will be seen by those skilled in the art that any desired and practical number of sections may be assembled on the shaft. The machine may be operated with one section alone or with as many as the shaft will hold. A further advantage of this construction is that if one section fails it can be taken off and another substituted without having to replace the entire roll.

While I have described the illustrated embodiment of my invention in some particularity, modifications and variations may occur to those skilled in the art to which it appertains, for example, the diameter of the cutting roll or the number of end cut-off knives may be varied to control the length of the individual siding strips cut, the shape and position of the cutting knives may be changed to cut any desired shape of cut-out, the sections of the roll may be of different widths and have different knife arrangements whereby a number of different products may be cut from the sheet at the same time. I do not, therefore, limit myself to the precise details shown and described, but claim as my invention all embodiments thereof coming within the scope of the subjoined claims.

What is claimed:

1. In a machine for cutting sheet material the combination of a smooth faced roll, a cutting roll having a plurality of longitudinally spaced circumferentially extending slitting cutters, circumferentially spaced cut-out dies and axially extending end cut-off knives, and means for feeding sheet material between said rolls.

2. In a machine for cutting sheet material, the combination of a smooth faced roll, a cutting roll adapted to co-act with said smooth faced roll and having axially spaced disc cutters adapted to cut parallel longitudinal slits in said sheet material, circumferentially spaced cut-out knives adapted to cut out portions of the sheet material, axially extending end cut off knives, and means for causing the sheet material to pass between said smooth faced roll and said cutting roll.

3. A machine for cutting sheet material, comprising a backing up roll, a co-acting cutting roll having a disc slitting knife, a plurality of tab cut-out dies and a plurality of end cut-off knives, and means for feeding said sheet material between said rolls.

4. A machine for cutting sheet material comprising a backing up roll, a co-acting cutting roll having a disc slitting knife, independently removable tab cutting knives a plurality of end cut-off knives adjacent said slitting knives, said tab cutting knives having their cutting edges arranged to form a cut-out die, and means for feeding said sheet material between said rolls.

5. A cutting roll comprising a shaft, a plurality of knife carrying sections mounted on said shaft, each of said sections having a hub portion and a plurality of axially extending slotted arms carried by and spaced from said hub portion and from each other, cut-out knives secured in said slots, a disc knife carried by said arms, said cut-out knives and disc knife defining cut-out dies having a continuous cutting edge, an end cut-off knife on each of said sections, and means for securing said sections to said shaft.

6. In a cutting roll of the class described, a shaft, a plurality of knife carrying sections mounted on said shaft, each of said sections having a hub portion and a plurality of axially extending slotted arms, said arms being supported at one end by said hub portions and carrying a disc cutter at their unsupported ends, said slots in said arms extending radially therethrough and axially inwardly from their unsupported ends, independently removable cutting blades secured in and defining the edges of said slots and an end cut-off knife on each of said sections.

In testimony whereof I hereunto affix my signature this 21st day of December, 1929.

EDWARD C. OTIS.